United States Patent
Hibbard et al.

[11] Patent Number: 5,818,597
[45] Date of Patent: Oct. 6, 1998

[54] PROJECTION SYSTEM VISUAL CHARACTERISTICS ANALYZER

[75] Inventors: Earl R. Hibbard, Arcadia; James A. Cashin, Malibu, both of Calif.

[73] Assignee: Ultra Stereo Labs, Inc., San Luis Obispo, Calif.

[21] Appl. No.: 734,667

[22] Filed: Oct. 22, 1996

[51] Int. Cl.$^6$ .................................. G01J 1/00; G01J 1/42
[52] U.S. Cl. ..................... 356/121; 356/213; 356/218
[58] Field of Search .................... 356/121–123, 356/213, 218, 221, 229, 230

[56] References Cited

U.S. PATENT DOCUMENTS

| | | | |
|---|---|---|---|
| 2,431,575 | 11/1947 | McCune | 356/218 |
| 2,831,054 | 4/1958 | Harris | 356/218 |
| 5,067,811 | 11/1991 | Ouchi | 356/121 |
| 5,164,785 | 11/1992 | Hopkins et al. | 356/121 |
| 5,426,500 | 6/1995 | Ohana | 356/218 |

*Primary Examiner*—Frank G. Font
*Assistant Examiner*—Amanda Merlino
*Attorney, Agent, or Firm*—Andra M. Vaccaro

[57] ABSTRACT

The present invention is a system and method to expeditiously and accurately measure the luminance, weave, jump and flicker of an object so that the best luminance available for that object may be achieved by making adjustments to the light source, the reflecting surface and the like. A scanning light receiver which produces a two dimensional optical image of the object whose luminance is to be tested, is set up so that it may view a substantial portion of the object. The light receiver is connected to a analyzer and interface unit ("AIU") to which it sends an electronic image representing the reflected luminance of the object during each scan. The reflected light that is detected by the light receiver is then analyzed by the AIU to determine the luminance levels, weave, jump and flicker of the luminance across a substantial portion of the object by measuring the voltage of each pixel detected by the light receiver measured against the voltage produced by a black level.

51 Claims, 2 Drawing Sheets

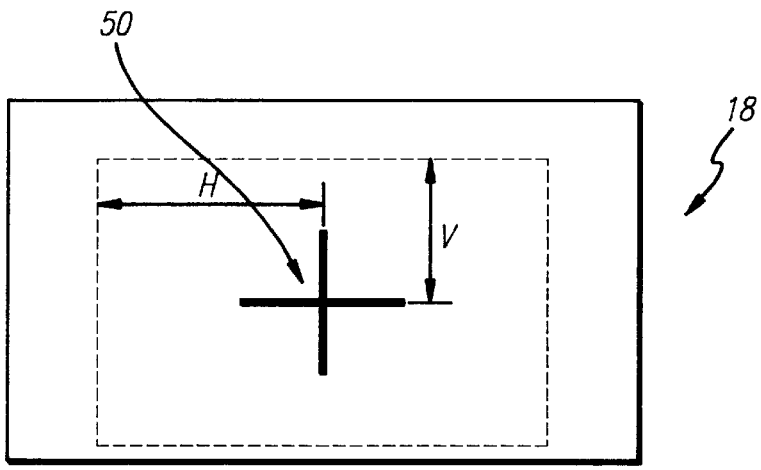
FIG. 4
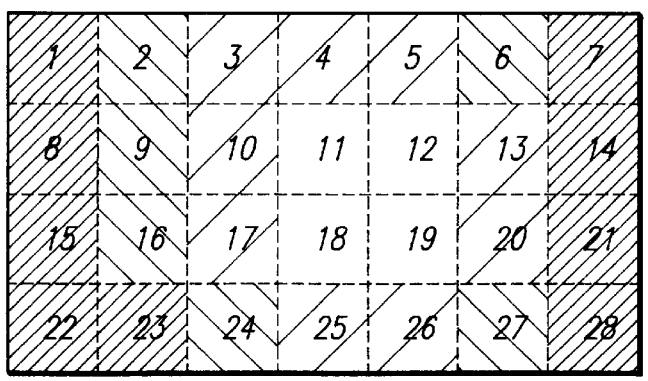
FIG. 5
FIG. 6

PROJECTION SYSTEM VISUAL CHARACTERISTICS ANALYZER

BACKGROUND OF THE INVENTION

Field of the Invention

The invention relates to the field of performance measuring equipment for motion picture presentations.

BACKGROUND OF THE INVENTION

There are no instruments currently available that can be used to measure several key performance parameters of motion picture presentations such as overall luminance (brightness of the screen image), low or imperceptible variations in the intensity of the luminance of the screen (otherwise known as "flicker"), and the amount of horizontal and vertical motion of an image that is being displayed on the screen (known respectively as "weave" and "jump" of the image). For example, flicker can be very distracting and fatiguing even when a viewer is not conscious of the flicker.

Present day color film print stock is formulated to give best picture quality when the projection and screen system provide a maximum luminance of approximately 16 ft Lamberts. If less than maximum luminance is obtained, the screen will display a picture or inconsistent luminance is achieved, some viewers may notice a flicker in the brightness level. It is also important that the luminance is consistent across the entire screen area.

It is well known in the art that a motion picture image on a film is projected onto a screen when a light passes through the film as it is being fed frame by frame through a projection device. Specifically, as a film is fed through a film projector, each film frame is advanced through a gate in the projector within approximately ten milliseconds. The frame is then held stationary in the projector's gate for approximately 30 milliseconds while a shutter opens so that the frame is exposed to two ten millisecond pulses of light, such that light pulses at a rate of 48 Hertz are projected through the film, through a projection lens and then onto a movie screen to create a visible image. Each new frame is projected every one-twenty-fourth of a second.

If each frame is positioned in the gate exactly as was the previous frame, then the screen image will appear stationary to the viewer. However, if the film frames move laterally or slightly "fishtails" as it goes through the projector gate, then the screen image will move slightly on the screen and causes what is commonly referred to in the art as film "weave".

Further, if there is some variation in the vertical position of each frame as it is held stationary in the gate, then there will be a condition that is commonly referred to in the art as "jump" or "jitter".

A number of factors affect the consistency of the luminance on the screen. Some of the most important factors are the alignment of the light source (sometimes referred to as the "lamp house") with the projector optics; the adjustment of the light source optics; the luminous power output of the light source; the quality of the projection lens; and the screen "gain", shape, and surface quality.

Therefore, in order to obtain the best quality picture available for a motion picture film, adjustments and measurements of the luminance of the screen and the detection and correction of weave, jump and flicker have to be made during installation and maintenance of the projection equipment.

Presently, there are several devices and methods that are used to measure and adjust the luminance level. For example, there is known in the prior art a device known as a "spotmeter," which can be used to manually measure the luminance level by taking a reading of the luminance usually at the center of the screen. The variations in the luminance level can be measured with the spotmeter by measuring the luminance levels at various other locations on the screen and comparing the measurements with the luminance level at the center of the screen. Any adjustments in the luminance must be made manually.

The spotmeter is similar to a light meter used in photography except that it measures the reflected light rather than the incident light. The spotmeter is comprised of a photocell attached to a lens that measures the light in a 1° optical path. Thus, it can only view a small area at a time and must be manually moved in order to take measurements over a large area.

Another method used to measure the luminance of the projection system is where a technician uses his naked eye to review the luminance of a screen. However, the human eye is very poor at recognizing or measuring differences in luminance levels.

Another prior art device, the imaging spectroradiometer, described and disclosed in U.S. Pat. No. 5,424,543 issued on Jun. 13, 1995 to Mark Dombrowski, is an instrument that uses a CCD video camera for the purpose of creating spectral images of a scene. Displaying both spatial form and spectral radiance, the spectroradiometer allows acute discrimination of objects within the image. This instrument is designed to provide highly accurate images of a scene for analysis of objects within the scene, but has no means to measure the variation in luminance, weave, jump and flicker of motion picture images.

A further prior art device is described and disclosed in U.S. Pat. No. 5,239,174 issued on Aug. 24, 1993 to Raymond Klein entitled "Spectral intensity measuring system for measuring repetitively pulsed light having a multichannel detector array and adjustment system including a digital phase locked loop." In this patent, a measuring system is disclosed that measures the incident light emitted from a light source such as a xenon light, a flourescent lamp or a CRT. It performs this measurement by synchronizing the peak amplitude of a pulsed light source with the amplitude of a multichannel array spectroradiometer before measuring the incident light. The accuracy of the measurement is wholly dependent on the synchronization, such that a tight synchronization must be maintained at all times. While with the proper optics, this prior art system could possibly measure the average reflected light from a movie screen, it would not be able to differentiate between luminance measurements at various locations on the screen. Likewise, this system is unable to measure weave or jump.

Since adjustments often need to be made to the lamphouse optics in movie projectors, for example, after replacement of a bulb, recalibration of the luminance pattern using the devices and methods known in the prior art can be a tedious process and often results in a less than optimum light pattern on the screen. Therefore, there has been a long felt need to provide a means to easily, quickly and accurately measure the luminance, weave, jump and flicker of projection equipment and movie screens, so that optimal viewing of a movie easily may be achieved.

SUMMARY OF THE INVENTION

The present invention is a system and method to expeditiously and accurately measure the luminance of an object so that the best luminance available for that object may be achieved by making adjustments to the light source, the reflecting surface and the like. For example, using the method and system of the present invention, the light source, projector and screen projector continually may be fine tuned, until optimum luminance across the entire movie screen is achieved.

The present invention also simplifies and expedites the measurement and adjustment process of motion picture luminance reflecting off a movie screen.

The inventors wish to acknowledge Larry Jacobson of LJ TECHNOLOGIES who suggested to them the need for a system to measure luminance projected on the entire surface of a movie screen using a more sophisticated system than was preciously known in the prior art and incorporating the use of a video camera.

The present invention also enables the luminance to be fine tuned so that it is at its optimal desired value.

The present invention also permits data to be generated and stored of the various luminance measurements and of the weave, jump and flicker.

The present invention fulfills a long felt need to provide a means to easily, quickly and accurately measure and adjust the luminance of light projectors on a surface such as movie screens, so that optimal viewing of that surface may be achieved.

The present invention also provides a system and method for detecting flicker, weave and jump so that adjustments can be made to the projection equipment so that optimal viewing of a movie can be achieved.

In the present invention, a light source is projected onto an object whose luminance is to be tested. A scanning light receiver which produces a two dimensional optical image of the object whose luminance is to be tested, is set up so that it may view a substantial portion of the lighted object. The light receiver is connected to a analyzer and interface unit ("AIU") to which it sends an electronic image representing the reflected luminance of the object during each scan. The reflected light that is detected by the light receiver is then analyzed by the AIU to determine the luminance levels, weave, jump and flicker of the luminance across a substantial portion of the object.

The AIU continuously analyzes the screen luminance pattern by measuring the voltage of each pixel detected by the light receiver measured against the voltage produced by a black level. As each analysis is complete, the AIU creates data representing the results of the scan. The data is sent to a laptop, where it can be viewed or stored by a technician, and/or uses the results to adjust and/or align the components of the light source.

In the preferred embodiment, the results are displayed in graphic form divided into a plurality of zones, each representing a corresponding area on the surface of the object. The results may appear either as an enhanced gray scale to emphasize the variations in luminance between the plurality of different zones or as a number within each zone to indicate its luminance measurement.

By using the system and method of the present invention, the light source may be adjusted by using the pattern of luminance that is detected by the system and method of the present invention to determine where the brightest area generated by the light source is located and then moving the components in the light source until the brightest area generated thereby is located at the central point on the object.

By using the system and method of the present invention, low frequency variations in luminance can be detected and measured and/or adjusted. Likewise, the method and system of the present invention can easily and quickly measure jump and weave.

Thus, by using the instrumentation and method of the present invention, the projection system and/or light source easily can be fine tuned so that the image that is to be viewed will be shown with the best luminance available. Adjustments using the system and method of the present invention are usually much more accurate and require less time than using any of the devices and techniques known in the prior art.

In addition, the system and method of the present invention also presents a means by which the measurements can be displayed and stored. In this way, a projection system can be monitored to discover the degradation of the various components of the system, as well as record the optimal measurements that can be achieved to determine when replacement of various projection components or objects and/or alignment of the light source and/or projection optics need to take place.

BRIEF DESCRIPTION OF THE DRAWINGS

FIG. 4 is a plan diagram of the movie screen showing how weave and jump are measured;

FIG. 5 is a block diagram illustrating the components used to measure flicker of the screen luminance; and FIG. 6 illustrates an example of the results obtained for the luminance of a movie screen using the system and method of the present invention.

DETAILED DESCRIPTION OF THE DRAWINGS

It is well known in the art that a motion picture image on a film is projected onto a screen when a light passes through the film as it is being fed frame by frame through a projection device. Specifically, as a film is fed through a film projector, each frame is pulled through a gate in the projector at a rate of approximately forty milliseconds for each frame. The frame is advanced in ten milliseconds and held stationary in the projector's gate for approximately thirty milliseconds while two pulses of light, usually at a rate of 48 Hertz are projected through the film and projection lens onto the movie screen to create a visible image.

While the light source is constant; the light emitted from the projector is not. A shutter in the projector interrupts the light path, twice for each frame for two 10 millisecond pulses of light or at a rate of 48 Hz.

However, for various reasons, such as misalignment of the light generator (sometimes referred to as the "lamp house") with the projector optics; screen or optic degradation, replacement of the light source, movement of the projector and the like, the luminance across a movie screen may become inconsistent.

If less than optimum luminance is obtained, the screen will display a picture with color that appears dull and "washed-out". Conversely if excessive or inconsistent luminance is achieved, some viewers may notice a flicker in the brightness level. Thus, it is important that the screen luminance is optimum and consistent across the entire screen area.

In addition, the viewing quality of the motion picture is affected by the consistency of the position of each frame in the gate of the projector. If the frame is positioned exactly as was the previous frame, then the screen image will appear stationary to the viewer as each new frame is projected every one-twenty-fourth of a second. However, if the film frames move laterally as the film goes through the projector gate, then the screen image will move slightly on the screen and causes weave. Likewise, if there is some variation in the vertical position of each frame as it is held stationary in the gate, then it will cause jump.

Figure 1:
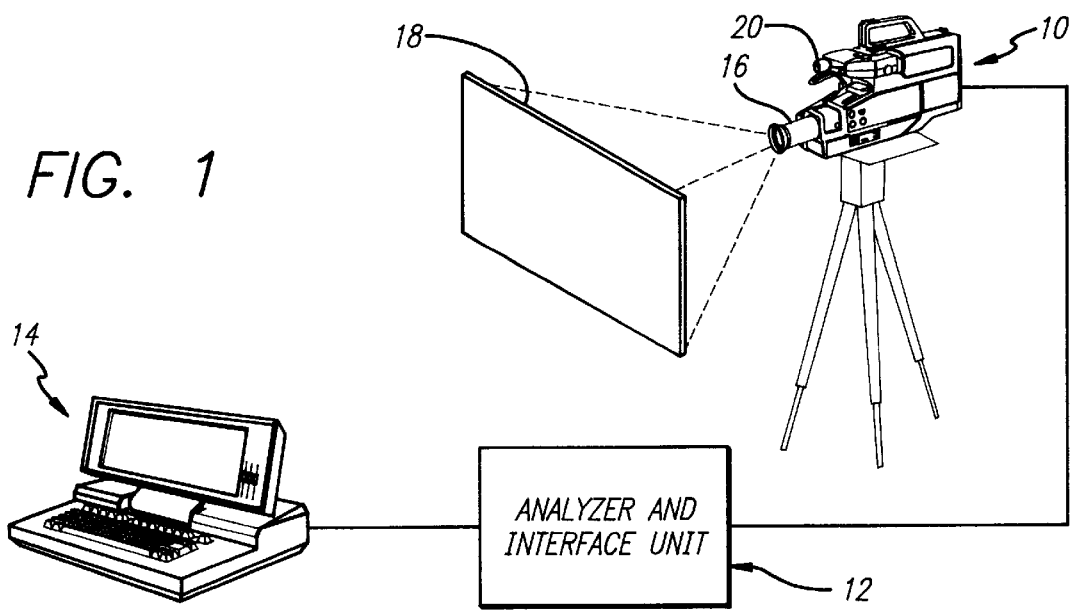
FIG. 1 is a block diagram of the system of the present invention.

Referring first to FIG. 1, light generated by a light source (not shown) is projected against a surface such as a movie screen 18, as shown in FIG. 1. In the preferred embodiment, the light source comprises a projector (not shown) containing a light generator (not shown) which is turned on and directed at a movie screen 18, whose luminance is to be tested, measured and adjusted until optimum luminance across the entire movie screen is achieved.

A light receiver 10, comprising a lens 16 which produces a two dimensional optical image and a light detection means 20, is connected to display unit 14 via an analyzer and interface unit 12 ("AIU"). In the preferred embodiment, receiver 10 also comprises means for scanning the optical image and producing a varying voltage which corresponds to the light level at each pixel of the scanned image.

AIU 12 comprises means to capture and store individual image frames detected by receiver 10. It also comprises means to measure and store selected pixel values within a frame and means to average a number of pixel values within a selected area of an image. AIU 12 modifies the measured values as needed to correct for systemic errors, such as variations in sensitivity of the light receiver 10, and aberrations of lens 16 and the like.

In the preferred embodiment, AIU 12 comprises a digital signal processor 42 and an analog to digital converter 40 shown in FIG. 5, in addition to memory and such other circuitry (not shown) and available software necessary to provide the signal analysis functions and interface functions set forth above for communications with the remainder of the system. In the preferred embodiment, such other circuitry may include, but is not limited to, a power supply, RS-232 drivers and receivers, communications specific software, and camera cable termination and receiving circuitry.

In the preferred embodiment, the light receiver 10 is a television camera, which is mounted either in the audience area or in the projection booth of a theater. In the preferred embodiment, the lens 16 is a zoom lens which has at least a 4:1 zoom ratio. Lens 16 is mounted on the front of camera 10, and light detection means 20 comprises a photoelectric cell ("P.E.Cell") which detects light reflected from screen 18.

Figure 2:
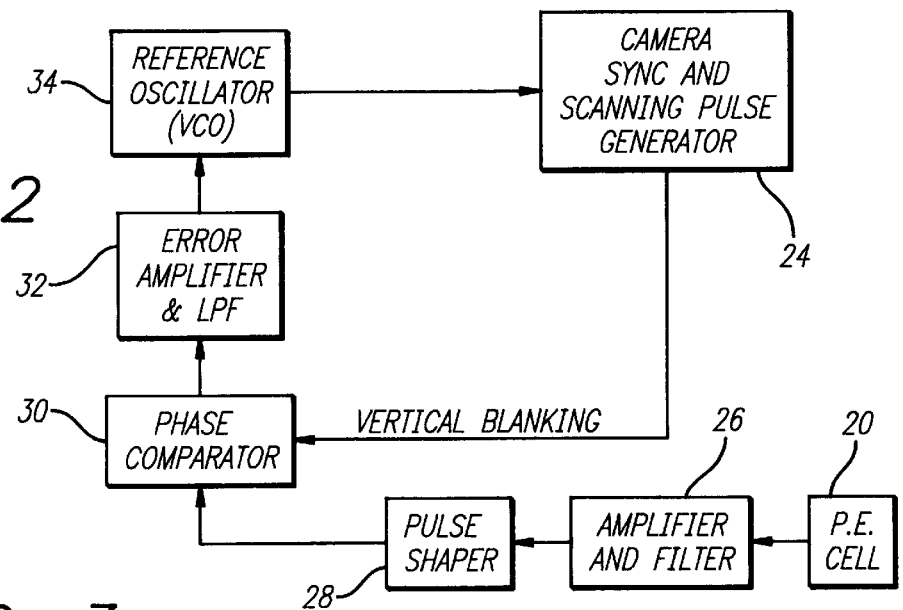
FIG. 2 is a block diagram of the preferred embodiment of the synchronizer used in the present invention.

Referring more specifically to FIG. 2, a block diagram of a portion of the components of the preferred embodiment of the light receiver 10 is shown. In order that when each light pulse is emitted from the projector it will be entirely captured by a field scan of the light receiver 10, in the preferred embodiment, the receiver 10 comprises components that obtain synchronization between the field scan and the pulse train of the light source. Thus, in the preferred embodiment of the present invention, the receiver 10 is able to scan the screen 18 at the same rate and phase as the light pulses emitted by the projection equipment.

As shown in FIG. 2, receiver 10 contains a sync and scanning pulse generator 24 which determines the rate and phase of each field scan of the receiver 10. While TV cameras, such as the one used in the preferred embodiment, usually employ crystals as their timing reference, in the system of the present invention, the crystal has been replaced by a reference oscillator 34 as the basic timing for the sync generator 24 which facilitates the ability of the camera to be locked in the same phase as the projector.

In operation, in order that synchronization may be achieved, after photoelectric cell 20 in FIGS. 1 and 2 detects the light pulses reflected from screen 18, it converts them into signals which are fed into amplifier and filter means 26. Amplifier and filter means 26 has a frequency response that is sharply peaked at the frequency of the light pulse train emitted from the light source, in order to provide gain and to discriminate against light variations at other frequencies.

In the preferred embodiment, amplifier and filter means is sharply peaked at 48 Hz and can discriminate against light variations at frequencies such as 60 Hz and 120 Hz.

Amplifier and filter 26 cleanses the signal by filtering out any noise components and amplifies the converted filtered signals into an essentially sinusoidal wave representing the projector light pulses that are detected on the screen.

In order to achieve optimal synchronization, in the preferred embodiment, the output of the amplifier and filter 26 is fed into a pulse shaper 28. Pulse shaper 28 converts the essentially sinusoidal output into a square wave according to the requirements of phase comparator 30, which is utilized to continually monitor the phase comparison of the signals generated by the photoelectric cell 20 and the camera sync and scanning pulse generator 24.

If a phase difference is detected, the phase comparator 30 generates an error signal which is amplified by error amplifier and filter 32. Thereafter, the amplified and filtered error signal is fed into the reference oscillator 34 so that it will vary the phase and/or frequency of the reference oscillator 34 until the signal produced by sync generator 24 is phased locked at the same rate and phase as the light pulses generated by the projector.

Thus, when each light pulse of a 48 Hz train is emitted from the projector, it will be entirely captured by a field scan of the camera 10.

While in the preferred embodiment the light receiver 10 is synchronized with the light pulses reflecting off the screen 18, the AIU 12 also can be used effectively without the light receiver 10 being synchronized with the light pulses. If synchronism does not exist, the light receiver 10 will also detect the time period between the light pulses. Thus, the luminance readings will vary whenever the phase of the light receiver 10 and the phase of the light pulses are out of sync. Peak readings would have to be made and the measurement process would be much slower.

Referring again to FIG. 5, the analyzer and interface unit ("AIU") 12 of FIG. 1 is shown in part connected to the photoelectric cell 20 of receiver 10 through amplifier 46. Due to this connection, the AIU 12 is able to analyze the light pulses detected by the photoelectric cell 20 and thereafter communicate the flicker measurements to the remainder of the system.

Figure 3:
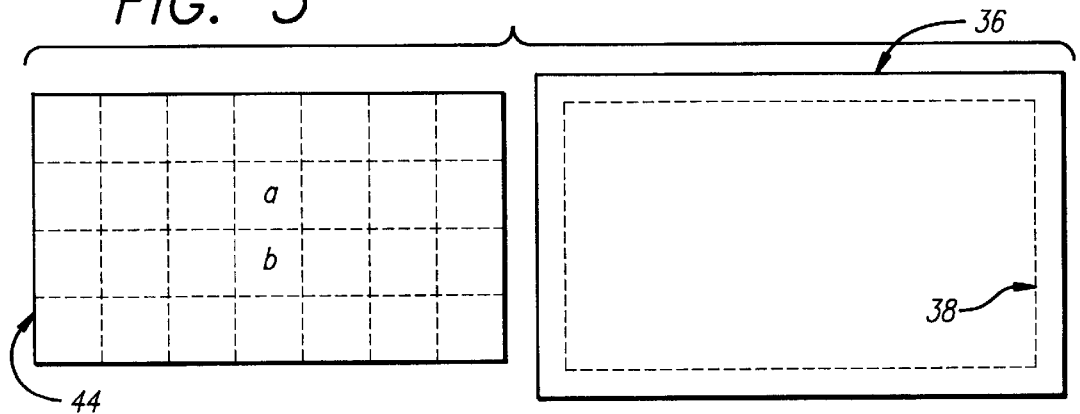
FIG. 3 illustrates a preferred image displayed by the present invention whereby the resulting image is divided into 28 distinct zones, each representing an area of the movie screen within the artificial borders established by the present invention.

When the screen luminance is to be measured, the projector and light source are operated normally, except that the projector does not contain any film. The TV camera is set in the audience area of the theater and the zoom lens is set so that the camera over scans the theater screen. The processing electronics in the AIU 12 detects the horizontal and vertical edges of the screen in the camera image 36. An artificial border 38 (see FIG. 3) is established within the screen image 36 that is preferably 5% smaller than the screen image in order to disregard any severe light variations that may occur near the edges of the screen. All luminance measurements are made within these artificial borders.

The portion of the screen image within the artificial borders 44 is divided into a selectable number of segments. Ten measurements of the pixel values (luminance levels) within each segment are made so that they are spread out over the entire segment. The ten values are averaged and the result is reported as the luminance level for that segment.

For optimal use of the system and method of the present invention, the movie screen image 44 within the border 38 is divided into a plurality of zones (1–28). In the preferred embodiment of the present invention, 28 distinct and separate zones are used because they approximate the screen aspect ratio (7:4) and they provide adequate definition of the luminance variations across the screen. The luminance values of central zones a and b can be averaged together and thereafter used as a reference value.

While technicians traditionally take one center luminance value and use that as the reference value, the system and method of the present invention, is able to quickly and easily average the center two values a and b and to come up with a more accurate reference value reading. In addition, where technicians usually have to manually scan the entire screen area, the system and method of the present invention also is able to report the luminance in each of the 28 zones and the pattern of luminance variation of screen 18. Thus, the luminance variations between the different zones of screen 18 may be determined and adjusted easily and quickly.

For example, the light source may be adjusted by using the pattern of luminance variation that is detected to determine where the brightest area generated by the light source is located and then moving the components in the light source until the brightest area generated by the light source is located at the central point on the screen.

The laptop computer 14 interfaces with the AIU to display the measurement results so that they can easily be understood. The laptop computer also controls the various functions of the AIU to determine which measurements should be taken.

The AIU analyzes the screen luminance pattern by measuring the voltage of each pixel detected by the camera against a reference voltage which is the voltage produced by a black level. Once this analysis is complete, the computer sends the results to a laptop computer, where it can be viewed by a technician, printed out or stored. The image that is displayed on the lap-top computer is divided into a plurality of zones representing a corresponding area on the movie screen.

FIG. 6 illustrates an example of a graphic image that might be displayed on screen of the lap-top computer 14 as each of the luminance measurements are being made. In FIG. 6, an enhanced gray scale image of the movie screen is shown in which the variations in luminance level between each zone of the screen are exaggerated in order to emphasize the light pattern variations to the person making the measurements.

As can be seen in FIG. 6, zones 11, 12, 18 and 19 are the brightest; zones 1, 7, 8, 14, 15, 21, 22, 23 and 28 are the darkest; and zones 2, 6, 9, 16, 24, and 27 are darker gray than zones 3, 4, 5, 10, 13, 17, 20, 25 and 26. Alternatively, a number representing the actual luminance in foot-Lamberts for that zone may be displayed in each zone.

Referring again to FIG. 6, zones 11, 12, 18 and 19 are the brightest. The display software in the laptop computer is designed to display the zones with the highest luminance value as white and display the remainder of the zones in varying shades of gray corresponding to their luminance value. In the preferred embodiment, four shades of gray are shown, each variation in shade indicating a two-foot Lambert decrease in luminance value.

For example, zones 11, 12, 18 and 19 might have a luminance value of 16 foot Lamberts, such that zones 3, 4, 5, 10, 13, 17 and 20 would have a value of 14 foot Lamberts. The darkest shade of gray would indicate an area having a value at 10 foot Lamberts or below.

Referring next to FIG. 4, in order to measure weave and jump, a target image 50 of a test film is projected on the screen 18. When weave and jump measurements are to be made, this special test film is threaded into the projector. This film has a clear field except for a pair of lines in the form of a cross. (See FIG. 4.) This film is projected onto the screen and the zoom lens of the camera is adjusted so that the cross fills approximately 70 to 90 of the camera image. The signal processing electronics and software then measure the horizontal displacement, (weave), and compare that value to the length of the horizontal line to compute the weave in terms of percentage of picture width. The jump is measured in the same manner using the vertical line for the dimensional reference.

Weave is the variation in horizontal position of the projected image which is normally expressed in terms of a percentage of picture width as set forth in Society of Motion Picture and Television Engineers Recommended Practices. (RP 105-1995.) Jump, is normally described in terms of percentage of picture height as set forth in the above Recommended Practices. As shown in FIG. 4, the picture height and width referred to above relates to the height and width of the entire film frame as it is projected on the screen. In the making of the test film, the target image 50 represents a predetermined dimensional relationship to the film height and width.

Using the system of the present invention, in order to determine weave, the processing means in AIU 12 measures the actual horizontal movement or displacement of the vertical line of image 50 in terms of the time lapse between the beginning of the horizontal scan and the actual time position of the vertical line. That time movement is compared to the time length of the horizontal line in the image. The fractional result is then modified according to the relationship of the horizontal line length to the image or "picture" width.

This measurement is made for every field of the camera scan. The data is then processed by a Fast Fourier Transform ("FFT")or other similar software element. Both the peak-to peak displacement data and the spectral data are presented to the lap-top for display on a graph, which along the vertical axis, shows the percentage of picture width amplitude versus the rate of displacement, which is displayed along the horizontal axis. Such data are important to analyze problems such as might be caused by a film guide or roller maladjustment of the projector screen, and/or light source and thereafter to make the appropriate adjustment to the screen, projector and/or light source in order to achieve optimal luminance.

The measurement of jump is done in a similar manner by the AIU 12. The vertical motion is detected and measured by time-position measurements of the horizontal line during each frame of the camera scan. The displacement is then related to the length of the vertical line in the image and then to the projected frame height. The data is the sent to the lap-top computer and/or used to adjust the projector, screen and/or light source. The lap-top display is presented in the form of a graph showing peak-to-peak jump in percentage of picture height versus the time-rate of the displacement.

In other words, the determination of weave requires the measurement of two quantities: the peak to peak variation in the horizontal position of a vertical line and the width of the projected film image. The determination of jump requires the measurement of the peak to peak variation in the vertical position of a horizontal line and the height of the projected image. The test pattern 50 provides edges and line lengths for the processing means in AIU 12 to make the required measurements and report the results. Other test patterns or images can be used to serve the same purpose, provided that horizontal and vertical lines are included that can be used to measure variation in position and line lengths or spacings that have known relationships to image width and height.

Flicker is measured with the projector and light source operating normally. The projector can be operated with clear film or no film, as decided by the person making the tests. The camera itself is not used during the flicker measurement, but the photoelectric cell mounted on the camera receives light from the screen and sends the resulting signal to the signal processing means in the AIU.

FIG. 5 shows a block diagram of the flicker measurement means of the present invention. The photoelectric cell 20 detects light pulses from screen 18 which is fed into a broadband amplifier 46. The signal is then fed to an A/D converter 40 to translate the signal into digital form. The digital signal processor 42 performs an FFT on the 48 Hz pulse train and presents data showing the luminance variations that correspond to flicker. The FFT treats the 48 Hz pulse train as a carrier signal. Lower frequency variations in luminance will appear as modulation on that carrier signal. Thereafter, the low frequency modulation elements are then displayed on a graph showing the amplitude of the flicker in terms of percentage of the carrier amplitude vertically and frequency of the flicker horizontally or used to adjust the screen, projector and/or light source.

Thus, the system and method of the present invention is able to accurately and rapidly measure and adjust the following major performance parameters of a motion picture projection system:

Luminance and the variation of the luminance across the screen,
Picture weave,
Picture jump, and
Luminance flicker.

Each frame of the camera comprises two fields. The lines in each field alternate in position and then are interlaced by the signal processor to comprise the entire frame. Thereafter, each frame of the scanned TV signal is stored in a memory buffer as voltage values with respect to the light that strikes it. The processing computer then utilizes a correction table to compensate for systemic errors. Thus, the system is able to compensate for such things as the fall off of the lens and variation of the sensitivity of the CCD element itself.

The lap-top computer also provides the capability to store the results of the measurements made for future reference and to print out the results in a format report form when a computer printer is connected and/or to adjust the screen, projector and/or light source so that optimal luminance is achieved.

While particular embodiments and techniques of the present invention have been shown and illustrated herein, it will be understood that many changes, substitutions and modifications may be made by those persons skilled in the art. It will be appreciated from the above description of presently preferred embodiments and techniques that other configurations and techniques are possible and within the scope of the present invention. Thus, the present invention is not intended to be limited to the particular embodiments and techniques specifically discussed hereinabove.

What is claimed is:

1. A system for measuring the visual performance characteristics of a projection system comprising a projector component, lens components, a screen component and a light source component projecting light on the screen surface so as to obtain optimal luminance on the screen, said visual performance characteristics measuring system comprising:

means for receiving the light from the light source, said receiving means producing a two dimensional optical image of the surface of the screen and converting each pixel of the surface image into a signal having a phase and frequency, said receiving means comprising means for scanning the surface and producing a varying voltage which corresponds to the luminance of each pixel of the scanned surface image;

means for synchronizing said receiving means with the light source in the projection system;

means to repeatedly analyze, capture and store individual optical surface images connected to said receiving means, wherein said analyzing means measures and stores selected pixel values within each optical image during each scan and reports the light intensity values of said selected pixels during each scan, said analyzing means capable of detecting any change in the light intensity value of each of said selected pixels during subsequent scans;

error correction means for modifying the reported light intensity values to correct for system errors, wherein the visual performance characteristics of each of the components of the projection system may continuously be measured, compared, reported and adjusted so as to achieve optimal luminance across the surface of the screen.

2. The visual performance characteristics measuring system of claim 1, wherein said lighting means emits pulsing light and said receiving means comprises means to synchronize said receiving means with the pulses of light emitted from said lighting means.

3. The visual performance characteristics measuring system of claim 1 wherein said receiving means, comprises:

a sync generator for generating a field timing signal,
a light receiver for detecting the light projected by said lighting means on the surface and converting it into a detection signal,
a phase comparator for comparing said detection signal with a field timing signal generated by said sync generator and thereafter generating an error signal which varies the phase and/or frequency of said field timing signal until said field timing signal is phased locked at the same rate and phase as the light generated by said lighting means,
wherein when light is emitted from said lighting means, it will be entirely captured by a field scan of said light receiver.

4. The visual performance characteristics measuring system of claim 2, wherein said scanning means comprises means for modifying the scan rate so that the scanning means is phase locked at the same rate and phase as light generated by said lighting means.

5. The visual performance characteristics measuring system of claim 1 further comprising means for projecting an image on a screen; wherein said receiving means further comprises means for detecting and measuring any weave in the image that is projected on the screen.

6. The visual performance characteristics measuring system of claim 1, further comprising weave measuring means, wherein said weave measuring means comprises:

a test film comprising at least one vertical line and either a horizontal line length or spacing with a known relationship to the projected image width which are projected onto the surface by said lighting means; and means for measuring the time lapse between the start of the horizontal scan of the receiving means and the vertical line in the scanned film image during each field scan; and for measuring the time duration of the horizontal line length or spacing, and means for using the measured values to calculate and report the weave magnitude and spectral distribution.

7. The visual performance characteristics measuring system of claim 1 further comprising means for projecting an image on a screen; wherein said receiving means further comprises means for detecting and measuring any jump in the image that is projected on the screen.

8. The visual performance characteristics measuring system of claim 1, further comprising jump measuring means, wherein said jump measuring means comprises:

a test film comprising with at least one horizontal line and either a vertical line length or spacing with a known relationship to the projected image height which are projected onto the surface by said lighting means; and means for measuring the time lapse between the start of the vertical scan and the horizontal line in the scanned film image, and measuring the time duration of the vertical line lengths or spacing and means for using the measured values to calculate and report the jump magnitude and spectral distribution.

9. The the visual performance characteristics measuring system of claim 1, wherein said analyzing means comprises means for displaying zones on the surface with the highest luminance value as white and the zones with lesser luminance values as a shade of gray appropriate to their luminance value.

10. A visual performance characteristics measuring system for a projection system comprising a projector, lens, a viewing surface and a pulsing light source producing a light that is directed at and reflected off the viewing surface, said measuring system measuring and adjusting the luminance of the viewing surface having at least two dimensions and various area so that optimal luminance may be achieved, comprising:

a light receiver which continuously produces a two dimensional optical image of the luminance across various area of the surface;

means for synchronizing said light receiver with the pulsing light source;

display means for display the values of luminance on the various areas of the surface;

an analyzing and interface means, connected between said receiver and said display means, for capturing and storing each individual frame of surface images detected by said receiver and comprising means to measure and store selected pixel value within a each frame and means to average a number of pixel value within a selected area of a surface image and modifying each measured value as need to correct for systemic errors and variations in sensitivity of the light receiver, said analyzing means capable of detecting any change in the value of each of said selected pixels during each frame;

wherein in the luminance of the viewing surface may be measured, compared and displayed and the projection system adjusted according to the values displayed so as to achieve optimal luminance on that surface during a period of time.

11. The visual performance characteristics measuring system of claim 10 wherein the analyzing and interface means further comprises a digital signal processor, an analog to digital converter, and memory.

12. The visual performance characteristics measuring system of claim 10 wherein the analyzing and interface means further comprising means for measuring the voltage of each pixel detected by said receiver against a reference voltage which is the voltage produced by a black level.

13. The visual performance characteristics measuring system of claim 10 wherein said receiver comprises means for obtaining optimal synchronization between the field scan and a pulse train generated by said light source.

14. The visual performance characteristics measuring system of claim 10 further comprising means for projecting an image on a screen; wherein said analyzing means further comprises means for detecting, measuring and correcting any weave in the image that is projected on the screen.

15. The visual performance characteristics measuring system of claim 14, wherein said weave measuring means comprises:

a test film comprising a substantially blank, clear field with a horizontal line and a vertical line which are projected onto the surface by said light source; and means for measuring the time lapse between the start of the horizontal scan and the vertical line in the scanned film image during each field scan.

16. The visual performance characteristics measuring system of claim 10 further comprising means for projecting an image on a screen; wherein said receiving means further comprises means for detecting, measuring and correcting any jump in the image that is projected on the screen.

17. The visual performance characteristics measuring system of claim 16, wherein said jump measuring means comprises:

a test film comprising a substantially blank, clear field with a horizontal line and a vertical line which are projected onto the surface by said light source; and means for measuring the time lapse between the start of the vertical scan and the horizontal line in the scanned film image.

18. A system for measuring and optimizing the visual performance characteristics of a projection system that continuously displays motion pictures frames on a screen, comprising:

a light source generating pulsing light wave trains which is directed at the screen;

a scanning light receiver for detecting fields of said light waves as they are reflected off of the screen;

means for synchronizing the pulsing light wave trains with said scanning light receiver;

an analyzing and interface means, connected to said receiver and said display means, for capturing and storing each individual frame of said light waves detected by said receiver, comprising means to measure and store selected pixel values within a frame, means to average a number of pixel values within a selected area of the screen, and means for modifying the measured values as needed to correct for systemic errors, and variations in sensitivity of said light receiver, said analyzing means capable of detecting any change in the value of each of said selected pixels during each frame; and comparing and adjustment means for receiving the values from said analyzing and interface means which compares and adjusts the the movie projection system based on said received values so as to achieve optimal luminance on the screen so that when a movie picture is viewed on the screen, it will be shown in its optimal viewing capacity.

19. The visual performance characteristics measuring system of claim 18 wherein said light receiver is a television camera, which is mounted either in the audience area or in the projection booth of a theater.

20. The visual performance characteristics measuring system of claim 19, wherein said camera comprises:
    a zoom lens which has at least a 4:1 zoom ratio that is mounted on the front of said camera; and
    a light detection means which detects light reflected from the screen.

21. The visual performance characteristics measuring system of claim 18 wherein said light receiver comprises synchronizing means for obtaining optimal synchronization between the field scan and the pulse train generated by said light source, wherein said receiver is able to scan the screen at the same rate and phase as the light pulses emitted by said light source.

22. The visual performance characteristics system of claim 18 wherein said receiver further comprises:
    amplifier and filter means having a frequency response that is sharply peaked at the frequency of the light pulse train emitted from said light source in order to provide gain and to discriminate against light variations at other frequencies;
    light detection means for detecting the light pulses on screen and converting said pulses into signals which are fed into said amplifier and filter means,
    wherein said amplifier and filter means cleanses said signals by filtering out any noise components and amplifies the converted filtered signals into essentially sinusoidal waves representing the luminance detected in each field scan.

23. The luminance measuring system of claim 22, wherein said amplifier and filter means has a frequency response that is sharply peaked at the frequency of the light pulse train emitted from said light source, in order to provide gain and to discriminate against light variations at other frequencies.

24. The visual performance characteristics measuring system of claim 22, wherein said receiver further comprises:
    a sync and scanning pulse generator which determines the rate and phase of each field scan of said receiver;
    a reference oscillator for generating timing signals; and
    a phase comparator;
    wherein said phase comparator continually monitors the phase differences in the signals generated by said sync generator and the light pulses detected by said light detection means, such that if an phase difference is detected, said phase comparator will generate a error signal which is fed into said reference oscillator to vary the phase and/or frequency said reference oscillator until the signal produced by said sync generator is phased locked at the same rate and phase as said light pulses generated by said light source,
    wherein when each light pulse of a train is emitted from said light source, it will be entirely captured by a field scan of said light receiver.

25. The visual performance characteristics measuring system of claim 18 wherein the screen is divided by said analyzing and interfacing means into a plurality of zones providing adequate definition of the luminance variations across the screen and wherein the luminance in the center of the screen is measured and used as a reference value.

26. The visual performance characteristics measuring system of claim 18 further comprising means for projecting an image on a screen; wherein said receiving means further comprises means for detecting, measuring and correcting any jump in the image that is projected on the screen.

27. The visual performance characteristics measuring system of claim 18, further comprising jump measuring means, said jump measuring means comprising:
    a test film comprising a substantially blank, clear field with a horizontal line and a vertical line which are projected onto the surface by said lighting source; and
    means for measuring the time lapse between the start of each vertical scan and the horizontal line in the scanned film image.

28. The visual performance characteristics measuring system of claim 18 further comprising means for projecting an image on a screen; wherein said analyzing means further comprises means for detecting and measuring any weave in the image that is projected on the screen and means to correct any weave that is detected.

29. The luminance measuring system of claim 28, wherein said weave measuring means comprises:
    a test film comprising a substantially blank, clear field with a horizontal line and a vertical line which are projected onto the surface by said lighting source; and
    means for measuring the time lapse between the start of the horizontal scan and the vertical line in each scanned film image during each field scan.

30. The visual performance characteristics measuring system of claim 18 further comprising flicker measuring means for continuously detecting and measuring the variations in the intensity of said light fields wherein any flicker can be detected and corrected.

31. The visual performance characteristics measuring system of claim 30, wherein said flicker measuring means comprises:
    a light detection means to detect light from the screen and sends the resulting signal to said analyzing and interfacing means.

32. The luminance measuring system of claim 31, wherein the flicker measurement means further comprises a broadband amplifier for receiving the signal generated by said light detection means, an analog to digital converter which converts said signal into digital form; a digital signal processor which performs an FFT on the digital pulse train so that luminance variation corresponding to flicker may be measured.

33. A method for measuring the visual performance characteristics of a movie projection system in order to obtain the optimal luminance on a movie screen comprising the steps of:

projecting light pulses at the movie screen;

scanning the screen in various areas across the screen;

synchronizing the rate of the light pulses with the scanning of the screen;

detecting the luminance of the screen in said various areas across the screen;

analyzing the luminance of each of the areas of the screen using the area of the screen containing the brightest luminance as a point of reference; and displaying the results; and repeatedly adjusting the movie projection system based upon the luminance that is detected on the screen until the flicker, jump and weave is minimized and optimal luminance is achieved.

34. The method of claim 33, wherein said detection step, further comprises scanning the movie screen horizontally and vertically.

35. The method of claim 34, wherein said detection step further comprises synchronizing the field scan and the light pulses, wherein the screen is scanned at the same rate and phase as the light pulses.

36. The method of claim 34, further comprising the steps of:

projecting an image having a horizontal and vertical line which are projected onto the screen, each of said lines having a known time length, measuring the actual horizontal movement of the vertical line of said projected image in terms of the time lapse between the time at the beginning of a horizontal scan and the time at which said vertical line is first detected;

comparing said measured time to the known time length of said horizontal line in the image; and modifying the fractional result according to the relationship of the horizontal line length to the image width, wherein the weave of the film is determined.

37. The method of claim 34, further comprising the steps of:

projecting an image having horizontal and vertical lines onto the screen, said horizontal and vertical lines each having known time lengths;

measuring any vertical movement of the horizontal lines of said projected image in terms of the time lapse between the time at the beginning of a vertical scan and the time at which said horizontal lines are first detected;

comparing said measured time to the time lengths of the vertical lines in the image; and modifying the fractional result according to the relationship of the vertical line lengths to the image height, whereby the jump of the film is determined.

38. The method of claim 33, wherein the initial step comprises establishing a border within the screen that is preferably 5% smaller than the screen in order to disregard any severe light variations that may occur near the edges of the screen.

39. The method of claim 33, further comprising the steps of:

converting the detected luminance from the light pulses into a signal;

converting the signal into digital form; and processing the digital signal using a FFT;

wherein luminance variations corresponding to flicker may be measured and reported.

40. The luminance measuring system of claim 1 wherein said analyzing and interface means includes means for adjusting said lighting means so that said lighting means provides optimal luminance on the object.

41. The luminance measuring system of claim 18 wherein said analysis means adjusts said light source so that said light source provides optimal luminance on said screen.

42. The method for measuring the luminance and flicker of a movie screen of claim 33 comprising the step of:

adjusting the light pulse projector until the area with the brightest luminance is located in the middle of the screen.

43. A system for adjusting the luminance reflected off of the surface of on an object, comprising:

a light source which provides luminance that is directed at and reflected off of the surface of the object;

a light receiver which continuously produces a two dimensional optical image of the luminance across various areas of the surface;

means connected to said light receiver for determining the values of the luminance of said various areas of the surface;

analyzing and interface means connected to said receiver and said light source for repeatedly determining the value of luminance of said various areas of the surface and modifying the value as needed to correct for system errors and thereafter analyzing the values to adjust the relative position of the light source and object so as to achieve optimal luminance on the surface of the object during a period of time.

44. A system for measuring luminance of a surface, comprising:

lighting means for projecting light on the surface, means for receiving said light which produces a two dimensional optical image of the surface and for converting each pixel of the surface image into a signal having a phase and frequency, said receiving means comprising means for scanning the surface and producing a varying voltage which corresponds to the luminance of each pixel of the scanned surface image;

means to analyze, capture and store individual optical surface images connected to said receiving means, whereby said analyzing means measures and stores selected pixel values within each optical image and reports the light intensity values of said selected pixels, error correction means for modifying the reported values to correct for system errors, weave measuring means, comprising a test film comprising a substantially blank, clear field with a horizontal line and a vertical line which are projected onto the surface by said lighting means; and means for measuring the time lapse between the start of the horizontal scan and the vertical line in the scanned film image during each field scan, wherein the luminance of a surface may continuously be measured, reported and adjusted so as to achieve optimal luminance across the surface.

45. A system for measuring luminance of a surface, comprising:

lighting means for projecting light on the surface, means for receiving said light which produces a two dimensional optical image of the surface and for converting each pixel of the surface image into a signal having a phase and frequency, said receiving means comprising means for scanning the surface and producing a varying voltage which corresponds to the luminance of each pixel of the scanned surface image;

means to analyze, capture and store individual optical surface images connected to said receiving means, whereby said analyzing means measures and stores selected pixel values within each optical image and reports the light intensity values of said selected pixels, error correction means for modifying the reported values to correct for system errors, jump measuring means, comprising a test film comprising a substantially blank, clear field with a horizontal line and a vertical line which are projected onto the surface by said lighting means; and means for measuring the time lapse between the start of the vertical scan and the horizontal line in the scanned film image, wherein the luminance of a surface may continuously be measured, reported and adjusted so as to achieve optimal luminance across the surface.

46. A luminance measuring system for measuring and adjusting the luminance of a surface having at least two dimensions and various areas so that optimal luminance may be achieved, comprising:

a pulsing light source which is directed at and reflected off of the surface;

a light receiver which continuously produces a two dimensional optical image of the luminance across the various areas of the surface;

display means for displaying the values of the luminance on the various areas of the surface;

an analyzing and interface means, connected between said receiver and said display means, for capturing and storing each individual frame of surface images detected by said receiver and comprising means to measure and store selected pixel values within each frame and means to average a number of pixel values within a selected area of a surface image and modifying each measured value as needed to correct for systemic errors, such as variations in sensitivity of the light receiver, weave measuring means comprising:
 a test film comprising a substantially blank, clear field with a horizontal line and a vertical line which are projected onto the surface by said light source; and means for measuring the time lapse between the start of the horizontal scan and the vertical line in the scanned film image during each field scan,
 wherein the luminance of the surface may be measured, displayed and adjusted so as to achieve optimal luminance on that surface during a period of time.

47. A luminance measuring system for measuring and adjusting the luminance of a surface having at least two dimensions and various areas so that optimal luminance may be achieved, comprising:

a pulsing light source which is directed at and reflected off of the surface;

a light receiver which continuously produces a two dimensional optical image of the luminance across the various areas of the surface;

display means for displaying the values of the luminance on the various areas of the surface;

an analyzing and interface means, connected between said receiver and said display means, for capturing and storing each individual frame of surface images detected by said receiver and comprising means to measure and store selected pixel values within each frame and means to average a number of pixel values within a selected area of a surface image and modifying each measured value as needed to correct for systemic errors, such as variations in sensitivity of the light receiver, jump measuring means comprising:
 a test film comprising a substantially blank, clear field with a horizontal line and a vertical line which are projected onto the surface by said light source; and means for measuring the time lapse between the start of the vertical scan and the horizontal line in the scanned film image,
 wherein the luminance of the surface may be measured, displayed and adjusted so as to achieve optimal luminance on that surface during a period of time.

48. A luminance measuring system for measuring and adjusting the luminance of a screen that continuously displays motion pictures frames, comprising:

a light source generating pulsing light wave trains which is directed at the screen;

a scanning light receiver for detecting fields of said light waves as they are reflected off of the screen;

an analyzing and interface means, connected between said receiver and said light source, for capturing and storing each individual frame of said light waves detected by said receiver, comprising means to measure and store selected pixel values within a frame, means to average a number of pixel values within a selected area of the screen, and means for modifying the measured values as needed to correct for systemic errors, such as variations in sensitivity of said light receiver, jump measuring means comprising a test film comprising a substantially blank, clear field with a horizontal line and a vertical line which are projected onto the surface by said lighting source; and means for measuring the time lapse between the start of each vertical scan and the horizontal line in the scanned film image, wherein the luminance of the screen may be measured, displayed and adjusted so as to achieve optimal luminance on that screen so that when a movie picture is viewed on the screen, it will be shown in its optimal viewing capacity.

49. A luminance measuring system for measuring and adjusting the luminance of a screen that continuously displays motion pictures frames, comprising:

a light source generating pulsing light wave trains which is directed at the screen;

a scanning light receiver for detecting fields of said light waves as they are reflected off of the screen;

an analyzing and interface means, connected between said receiver and said light source, for capturing and storing each individual frame of said light waves detected by said receiver, comprising means to measure and store selected pixel values within a frame, means to average a number of pixel values within a selected area of the screen, and means for modifying the measured values as needed to correct for systemic errors, such as variations in sensitivity of said light receiver, weave measuring means comprising a test film comprising a substantially blank, clear field with a horizontal line and a vertical line which are projected onto the surface by said lighting source; and means for measuring the time lapse between the start of the horizontal scan and the vertical line in each scanned film image during each field scan, wherein the luminance of the screen may be measured, displayed and adjusted so as to achieve optimal luminance on that screen so that when a movie picture is viewed on the screen, it will be shown in its optimal viewing capacity.

50. A method for measuring the luminance, flicker and weave of a movie screen comprising the steps of:

projecting light pulses at a movie screen;

scanning the screen in various areas across the screen;

detecting the luminance of the screen in said various areas across the screen;

analyzing the luminance of each of the areas of the screen using the area of the screen containing the brightest luminance as a point of reference;

projecting an image having a horizontal and vertical line which are projected onto the screen, each of said lines having a known time length, measuring the actual horizontal movement of the vertical line of said projected image in terms of the time lapse between the time at the beginning of a horizontal scan and the time at which said vertical line is first detected;

comparing said measured time to the known time length of said horizontal line in the image; and modifying the fractional result according to the relationship of the horizontal line length to the image width, wherein the weave of the film is determined; and displaying the results.

51. A method for measuring the luminance, flicker and jump of a movie screen comprising the steps of:

projecting light pulses at a movie screen;

scanning the screen in various areas across the screen;

detecting the luminance of the screen in said various areas across the screen;

analyzing the luminance of each of the areas of the screen using the area of the screen containing the brightest luminance as a point of reference; and displaying the results;

projecting an image having a horizontal and vertical line onto the screen, said horizontal and vertical lines each having known time lengths;

measuring any vertical movement of the horizontal line of said projected image in terms of the time lapse between the time at the beginning of a vertical scan and the time at which said horizontal line is first detected;

comparing said measured time to the time length of the vertical line in the image; and modifying the fractional result according to the relationship of the vertical line length to the image height, wherein the jump of the film is determined.

* * * * *